United States Patent [19]

Minick

[11] 4,090,897
[45] May 23, 1978

[54] ULTRASONIC WELDING OF THERMOPLASTIC FABRICS

[75] Inventor: David G. Minick, Westfield, Mass.

[73] Assignee: The Sinclair Company, Holyoke, Mass.

[21] Appl. No.: 790,018

[22] Filed: Apr. 22, 1977

[51] Int. Cl.² .......................................... B32B 31/20
[52] U.S. Cl. .................................. 156/73.1; 28/100;
156/94; 156/290; 156/306; 156/497; 156/580.2;
428/196
[58] Field of Search ................... 156/73.1, 73.2, 73.4,
156/290, 580.2, 94, 306, 497; 28/1 HF;
428/196, 195

[56] References Cited

U.S. PATENT DOCUMENTS

| | | | |
|---|---|---|---|
| 2,465,996 | 4/1949 | Bloch | 28/1 HF |
| 3,666,602 | 5/1972 | Obeda | 28/1 HF |
| 3,973,066 | 8/1976 | Smith et al. | 156/73.2 |
| 4,018,955 | 4/1977 | Klauke et al. | 156/73.4 |

*Primary Examiner*—Edward G. Whitby
*Attorney, Agent, or Firm*—Chapin, Neal and Dempsey

[57] ABSTRACT

Method and apparatus for patching or seaming thermoplastic mesh fabrics, such as used in the papermaking industry by means of an ultrasonic welding tool. The tool is provided with one or more tips having raised surface portions or projections adapted for contacting the plastic mesh at a plurality of spaced points whereby ultrasonic welding is accomplished without substantial disruption or diminution of the generally uniform porosity inherent to the mesh fabric. The method modifications involve the use of templates for guiding the positioning and movement of the ultrasonic welding tips for both butt seaming and overlap seaming of the opposed edges of thermoplastic mesh fabric. In the butt seaming technique, the outermost weft filaments of the opposed edges of the plastic fabric are replaced by one heat stabilized filament and the picket ends of the fabric are interdigitated about this stable filament preparatory to the welding step.

6 Claims, 9 Drawing Figures

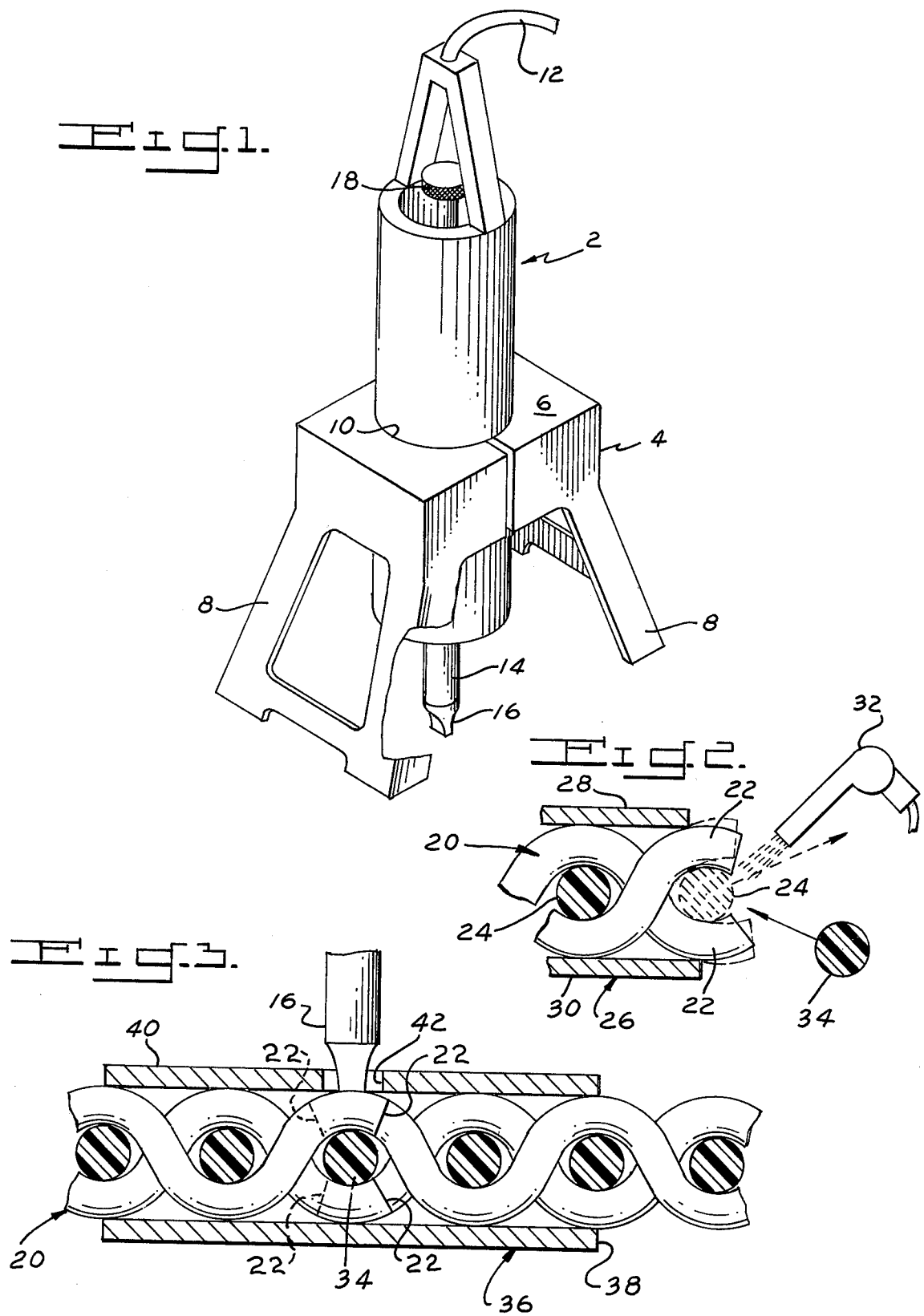

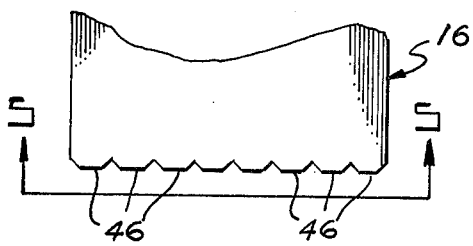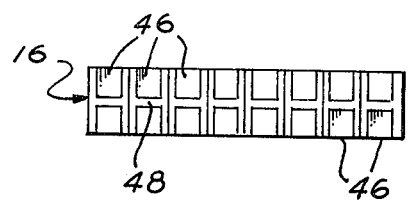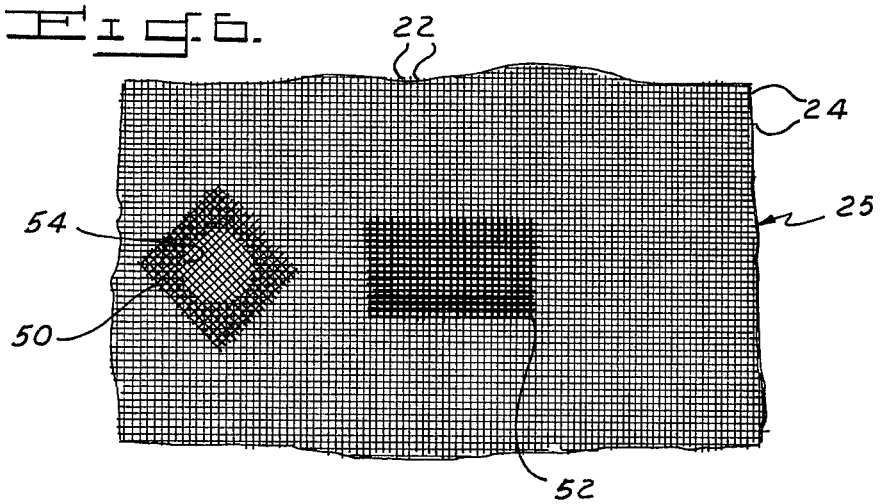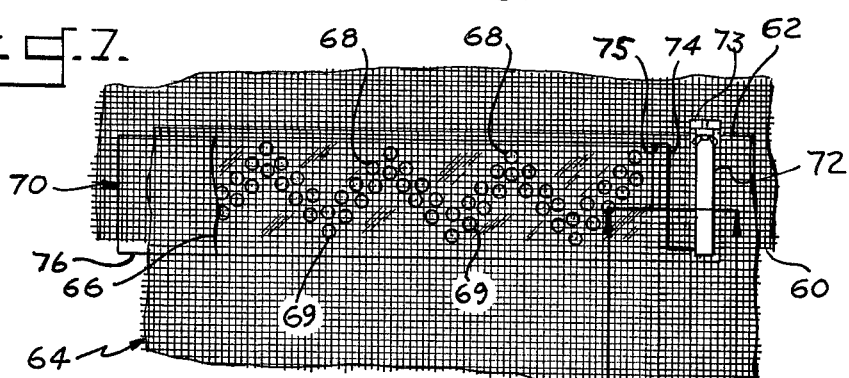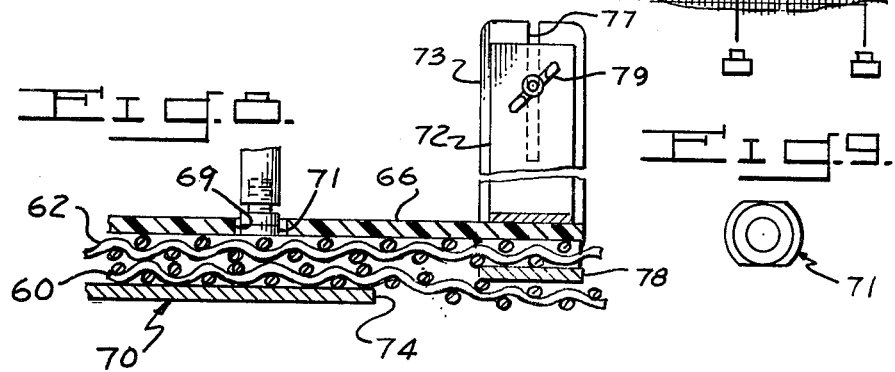

ULTRASONIC WELDING OF THERMOPLASTIC FABRICS

BACKGROUND

In the papermaking process a wide variety of equipment is used, such as Fourdrinier screens and various rolls, such as cylinder rolls and dandy rolls covered with a wire mesh screen or woven fabric. Such screens have customarily been fabricated of metallic filaments and for installation on a supporting structure, the opposite ends of the fabric have been seamed by sewing or brazing with precious metal alloys. In using such brazing techniques great care is required in applying the braze so that the uniform porosity inherent in the wire fabric cloth will not be disrupted. In recent years metallic wire cloth used in papermaking industry is being displaced by thermoplastic monofilament screens. As a consequence, patching and seaming procedures heretofore used in the industry are no longer suitable for use on these synthetic plastic fabrics and new techniques are being sought after.

It is the principal object of this invention to provide methods and means for patching and seaming thermoplastic monofilament fabric using ultrasonic welding techniques.

It is a further object of this invention to provide method and means for ultrasonic welding in such a way that the uniform porosity of the monofilament fabric is maintained in the weld zone in both the overlap or butt seams.

Another object of this invention is to provide ultrasonic welding apparatus for efficiently and economically carrying out the methods embodying this invention.

A still further object of this invention is to provide accessory apparatus for patching and seaming thermoplastic fabric using an ultrasonic welding implement.

Yet another object of this invention is to provide a method for butt seaming the ends of a thermoplastic fabric using ultrasonic welding, wherein the problem of thermoplastic filament distortion from the welding operation is substantially eliminated.

The above and other objects and advantages of the invention will be more readily apparent from the following description taken in conjunction with the drawings, in which:

FIG. 1 is a perspective view showing ultrasonic welding apparatus for use in carrying out this invention;

FIG. 2 is a partial cross sectional elevational view on a greatly enlarged scale illustrative of a step in the method embodying this invention;

FIG. 3 is a view similar to FIG. 2 illustrative of another step of the method;

FIG. 4 is a side elevational view on an enlarged scale showing a portion of an ultrasonic welding tip of the type embodying this invention;

FIG. 5 is an end view seen in the direction of 5—5 of FIG. 4;

FIG. 6 is a plan view showing two methods of patching thermoplastic mesh fabrics in accordance with this invention;

FIG. 7 is a plan view showing a method of lap seaming thermoplastic fabric in accordance with this invention;

FIG. 8 is a sectional view on an enlarged scale taken along line 8—8 of FIG. 7; and FIG. 9 is an end view showing the welding tip used in lap seaming.

In FIG. 1 an ultrasonic welding tool is shown generally at 2, being supported by a stand or base having an apertured platform portion 6 supported by outwardly diverging leg members 8. In the embodiment shown, the tool 2 is a generally cylindrical body which is frictionally gripped within the opening 10 of the base 4 and is slidable vertically relative to the stand by manual movement of the tool upwardly and downwardly against the frictional force of the opening 10 which serves to hold the tool in a fixed vertical position. The ultrasonic tool may be connected to a suitable source of electrical power by lead wire 12 connected to a transformer (not shown) by which electrical energy is converted to manual vibratory energy on the order of about 20,000 Hertz. The vibratory energy is transmitted to a so-called horn 14 and then to a tip 16 fitted onto the horn and by which ultrasonic energy is applied to the workpiece.

The tool is preferably equipped with a pressure sensitive switch which is activated by downward pressure of the tip 16 against an underlying workpiece. When the tool is pressed downwardly against a thermoplastic material, such as a mesh fabric superimposed on another fabric made of the same thermoplastic material, the vibratory energy causes localized heating between the two fabric layers and the thermoplastic will consequently melt and flow to form a permanent welded bond of the two superposed fabric layers in a fraction of a second. As shown, the ultrasonic tool 2 includes a knurled control knob 18 to enable adjustment of the amount of force required for the operation of the pressure sensitive operating switch built into the unit.

While for many purposes, particularly the seaming together of thermoplastic fabrics, it is desirable that the ultrasonic tool be used in assembled relation with the base or stand 4, for small welding jobs, which may be carried out in a relatively brief time, the tool may be removed from the stand and manually positioned at selected bonding sites of the workpiece. As will hereinafter be described, the ultrasonic tool may also be used alone or in conjunction with a template or guide means having slots or apertures for guiding the placement of the welding tip at a series of predetermined bonding sites of the thermoplastic fabrics to be welded, whereby a pattern of spot welds is readily obtained which provides for welded seams or patches of maximum strength and effectiveness.

In FIG. 2 is shown the edge of a thermoplastic fabric 20 composed of warp and weft filaments 22 and 24, respectively. The filaments are woven to form a synthetic plastic mesh fabric, such as also illustrated at 25 in FIG. 6 of the drawings.

For butt seaming together, the free ends of a thermoplastic fabric, as in fitting a fabric web around the frame of a papermaking machine, such as a cylinder mold or a dandy roll, the free or "picket" ends of the fabric are gripped by a clamping bracket 26 (FIG. 2) which includes upper and lower plate portions 28 and 30 disposed to grip and hold the outer edges of the fabric. Each picket end of the fabric is heated by a suitable heat source, such as the hot air blower or gun, as illustrated at 32. The air is directed along the edge of the fabric and is at a sufficient temperature deending on the thermoplastic material which makes up the fabric workpiece so that the outer ends of the warp filaments 22 will straighten because of the plastic memory of the filaments. In this way, the outer edges of the warp filaments, as shown by the dashed lines in FIG. 2, are caused to spread apart sufficiently to enable facile removal of the outermost weft or shute filament of the fabric. In the same manner, filament removal is carried out at the other free end of the fabric 20. A preshrunk thermoplastic filament, as shown at 34, is laid between the opened ends of the warp filaments 22 in the space which had been occupied by the removed filament 24. The use of a preshrunk filament is important since the temperature range required for welding would otherwise result in distortion or shrinking of the inserted filament. Since the filament 34 has been preshrunk, however, such thermal distortion is avoided and a uniform butt seam is obtained.

After the preshrunk filament 34 has been inserted along the picket edges of the fabric, its free outer edges are brought together, as shown in FIG. 3, with the warp filaments 22 of one edge interdigitated with the warp filament of the other free edge of the fabric whereby the warp filaments are disposed above and below the preshrunk filament in embracing relation. A clamping means or welding fixture 36 is now employed along the butted edges of the fabric 20. As shown, the fixture includes a metallic anvil or base plate 38 and a template or guide plate 40 which includes an elongated aperture or slot 42 which extends across the width of the fabric 20, generally parallel to the preshrunk weft filament 34. The fixture includes means, not shown, by which butted edge portions of the fabric are clamped together. The slot 42 is dimensioned to receive therethrough the welding tip 16 of the ultrasonic tool and to guide a tip, such as shown at 16, along the butted edges of the thermoplastic fabric. When the tip 16 is pressed downwardly against the fabric, a pressure sensitive switch built into the unit will cause ultrasonic energy to be applied to the thermoplastic material captured between the lower edge of the tip and the opposite portion of the anvil 38. The working surface of the tip 16 (FIGS. 4 and 5) preferably comprises a plurality of discrete nodes or projections 46 whereby the sites or spots to which the ultrasonic energy is imparted to the mesh fabric correspond to the node pattern of the tip. The weld sites achieved with each single operation of the tip 16 consists of about 16 separate areas arranged in two rows spaced apart by a groove 48 extending longitudinally from end-to-end of the tip 16. The spacing between the contact nodes 46 of the ultrasonic tip is made approximately equal to the spacing between warp filaments 22 of the fabric being seamed so that the weld points bond the picket ends of each warp filament to the preshrunk weft filament 34. In the matter of micro seconds, the vibratory energy will cause the warp filaments embracing the preshrunk weft filament and underlying the nodes 46 of the tip 16 to soften and fuse together to form a plurality of spaced weld sites whereby the welded seam is characterized by a porosity not substantially less than that of the fabric mesh per se.

As shown in FIG. 6, the welding tip 16 may also be employed for applying patches, such as shown at 50 and 52, to a synthetic plastic fabric mesh 25. In FIG. 6 is shown a fabric mesh with a generally circular hole 54 or one which has been trimmed to this configuration. A generally rectangular patch 50 of the same plastic mesh is placed over the hole with its warp and weft filaments oriented in a generally oblique or diagonal direction relative to the warp and weft filaments of the fabric. When the patch 50 is properly positioned, the ultrasonic tool 2 equipped with a welding tip 16 is used to weld the patch about its periphery permanently in place on the fabric 25 with the warp and weft filaments angularly displaced 45° relative to the base fabrics and warp and weft filaments. This diagonal or bias orientation permits the patch 50 to "stretch" or "skew" in the direction of major stresses carried by the warp and weft filaments 22 and 24 which make up the fabric 25. This arrangement enables distortion of the hole 50 to accommodate tension in the fibers of the fabric without direct application of these fiber forces to the weld sites. In patching holes of any substantial size, the bias application of a patching fabric is, therefore, preferable. In some instances, however, where a somewhat rectangular shaped hole is relatively small, it may be feasible to apply a generally rectangular patch, as shown at 52 in FIG. 6. The patching process used is generally the same as described for patch 50, except that the patch may be oriented with its warp and weft filaments in alignment with the corresponding filaments making up the fabric 25.

Lap seaming of fabrics, as illustrated in FIGS. 7 and 8, is also within the purview of this invention. As shown in FIG. 7, the outer edge portions 60 and 62 of a thermoplastic mesh fabric 64 are shown arranged in overlapping relation with the edge portion 62, superimposed over the edge portion 60, as best shown in FIG. 8. For lap seaming, a spot welding fixture or guide means is preferably used. As shown, the guide means comprises a template 66 in the form of a rectangular sheet or plate preferably formed of a suitable transparent material, such as Plexiglass or the like. The transparent template 66 is provided with two rows of longitudinally spaced apertures 68 and 69, each extending in a generally saw tooth or sinuous pattern from edge-to-edge across the template. Each of the apertures 68 defining one saw tooth row is disposed adjacent one of the apertures 69 of the second row whereby the aperture pattern consists of pairs of transversely aligned apertures 68 and 69. Each of the apertures is slightly larger than the diameter of the welding tip 71 (FIG. 8) to be used for spot welding together the overlapped fabrics, thus accommodating the insertion and removal of the tip to and from its contact with the upper surface of the fabric 62. Associated with the template 66, the guide means also comprises an anvil or metallic base plate 70 which serves the same function as the anvil 38 used in the butt welding process described above and illustrated in FIG. 3. As shown, the anvil 70 is a rectangular plate of generally the same size and configuration as the transparent template 66. The template 66 is connected by the upright leg portion of an angle bracket 72 to a handle 73 which extends upwardly from an edge portion of the anvil 70. The horizontal leg portion of the bracket 72 is affixed to the upper surface of the template. The handle includes an elongated vertical slot 77 and a suitable bolt type fastener 79 enables vertical adjustment of the transparent template to the appropriate height relative to the anvil 70. The handle 73 enables the guide means including the anvil and template to be manually positioned and moved in lap welding together the outer free edge portions 60 and 62 of a thermoplastic fabric 64.

In using the guide means illustrated, the anvil 70 is disposed under the outer edge portion 60 of the fabric. The anvil plate includes a transversely extending U-shaped slot 74 opening from one side edge 75 of the plate to a point adjacent the opposite edge 76. The slot provides an opening through which the lower edge portion 60 of the fabric may be led below an arm portion 78 of the anvil plate. The arm portion 78 is disposed above the plane of the remainder of the anvil so as to accommodate thereunder the thickness of the fabric 60, as shown in FIG. 8. The inner edge of the arm 78 and opposed edge of the plate 70 define slot 74. As shown in FIGS. 7 and 8, the two outer edges of the fabric are overlapped and sandwiched between the transparent template 66 and the anvil plate 70. As when starting from the left edge of the fabric 64, as illustrated in FIG. 7, the ultrasonic spot welder is inserted in each adjacent pair of apertures 68 and 69 to cause a series of welds in a saw tooth pattern across the portion of the overlapped fabric edges disposed between the transparent plate and the anvil plate. After completion of a pattern of welds at one position of the template, the operator may then simply slide the guide means using handle 73 to the next contiguous position. In this manner spot welds are progressively formed from one end to the other of the fabric. Since template 66 is transparent, the operator can visually observe the progress of the welding operation as he works. He can detect any wrinking or undesirable fabric displacement, accurately position and move guide means to the correct position and alignment and as he works such discrepancies can be readily corrected, thus minimizing misaligned and improper seam welds. The template and anvil when used in combination with an ultrasonic spot welding unit having a tip, as shown at 71, provides an accurate and efficient means of welding together of the overlapped fabrics with the requisite number and location of welds to securely bond the overlapped edges of the fabric together. Preferably, the ultrasonic welding tip used for this purpose includes a raised annular rim portion, as shown at 71 in FIG. 9.

The annular rim 71 results in ultrasonic welds or bonds of annular configuration which provides strong and effective weld sites. Moreover, when combined with the double saw tooth pattern of weld sites maximum resistance to seam break down is achieved since even if one or more welds is fractured, it will not cause substantial distortion of the fabric 64 as would more likely be the case if the seam welds were arranged along a straight line from edge-to-edge of the fabric. In addition, the annular shaped welds and saw tooth pattern causes minimal reduction of fabric porosity in the weld area.

Having thus described the invention, what is claimed is:

1. Method of bonding together mesh fabric composed of thermoplastic filaments comprising the step of juxtapositioning in overlapping relation free edge portions of said fabric with the filaments constituting one edge being superimposed with the filaments constituting the other edge, selectively compressing said superimposed filaments between a metallic anvil and the tip of an ultrasonic welding tool, said anvil being in the form of a metal plate with a transparent template carried thereby, said template being provided with a plurality of spaced apertures extending thereacross in an undulating pattern, and applying ultrasonic energy to said superimposed filaments at spaced points defined by the apertures in said template, the tip of said tool having a relief surface for engagement with said filaments.

2. A method of bonding together mesh fabric composed of thermoplastic warp and weft filaments comprising the steps of removing the outermost weft filament from the free edge portions of said fabric, substituting a preshrunk thermoplastic filament for one of the web filaments which was removed, juxtapositioning the free edge portions of said fabric by interdigitating the outer ends of said warp filaments of said fabric in embracing relation about the upper and lower surfaces of said preshrunk filament, selectively compressing said juxtapositioned edges between a metallic anvil and the tip of an ultrasonic welding tool by clamping together said juxtapositioned edges and applying ultrasonic vibratory energy using said welding tip to the interdigitated filaments for softening and fusing together the interdigitated ends of said warp filaments and said preshrunk weft filament, the tip of said tool having a relief surface for engagement with said filaments.

3. Method of bonding together the thermoplastic mesh fabric as set forth in claim 2 in which the outer edges of said fabric are heated by a hot air blower whereby the outer edges of said warp filaments open outwardly enabling removal of a weft filament from each of the free edge portions of said thermoplastic fabric, substituting a preshrunk thermoplastic filament for one of the weft filaments so removed, welding said warp filaments to said preshrunk weft filaments by using an ultrasonic welding tool vibrating at about 20,000 Hertz, said welding tool being vertically movably supported by a base fixture for selective spot welding contact with said fabric, said tool including a pressure sensitive switch for actuating the ultrasonic vibratory energy when the tip of said tool is pressed against said thermoplastic fabric.

4. Method of bonding together mesh fabric composed of thermoplastic warp and weft filaments comprising the steps of juxtapositioning a thermoplastic patch formed of warp and weft thermoplastic filaments over a hole in the thermoplastic mesh fabric, the warp and weft filaments of the patch being disposed at an oblique angle to the warp and weft filaments of the mesh fabric, welding the edges of said patch to said mesh fabric by the use of an ultrasonic tool having a relief tip with a plurality of spaced nodes engaged with the filaments about the marginal edge of said patch, compressing the marginal edges of said patch and said underlying portions of the mesh fabric between said spaced nodes and a metallic anvil disposed under said mesh fabric, the spacing of the nodes being approximately the same as the filaments of said patch, said tool being actuated by a pressure switch to emit vibratory energy.

5. Method of bonding together the thermoplastic mesh fabric as set forth in claim 1 in which said apertures are arranged in two adjacent parallel rows each following a saw tooth pattern extending across said template, adjacent apertures in said rows being aligned transversely of said template.

6. Method of bonding together mesh fabric composed of thermoplastic filaments comprising the step of juxtapositioning free edge portions of said fabric with the filaments constituting one edge being superimposed with the filaments constituting the other edge, selectively compressing said superimposed filaments between a metallic anvil and the tip of an ultrasonic welding tool having a relief surface for engagement with said filaments and applying ultrasonic vibratory energy at spaced points of said superimposed filaments to soften and fuse said thermoplastic filaments without substantial penetration by said tip of the thermoplastic filaments.

* * * * *